US008608479B2

(12) United States Patent
Liu

(10) Patent No.: US 8,608,479 B2
(45) Date of Patent: Dec. 17, 2013

(54) SYSTEMS AND METHODS FOR FACILITATING GAIT TRAINING

(75) Inventor: Wen Liu, Overland Park, KS (US)

(73) Assignee: The University of Kansas, Lawrence, KS (US)

( * ) Notice: Subject to any disclaimer, the term of this patent is extended or adjusted under 35 U.S.C. 154(b) by 346 days.

(21) Appl. No.: 13/102,444

(22) Filed: May 6, 2011

(65) Prior Publication Data

US 2011/0275043 A1 Nov. 10, 2011

Related U.S. Application Data

(60) Provisional application No. 61/332,615, filed on May 7, 2010.

(51) Int. Cl.
*G09B 19/00* (2006.01)

(52) U.S. Cl.
USPC .......... 434/255

(58) Field of Classification Search
USPC .......... 434/247, 250, 254, 255, 258; 482/51, 482/66, 69, 92, 95, 121; 602/16, 23, 26
See application file for complete search history.

(56) References Cited

U.S. PATENT DOCUMENTS

| | | | | |
|---|---|---|---|---|
| 1,144,085 | A * | 6/1915 | Abplanalp | 482/95 |
| 2,210,269 | A * | 8/1940 | Taylor | 601/33 |
| 5,067,709 | A * | 11/1991 | Christianson | 482/95 |
| 5,372,565 | A * | 12/1994 | Burdenko | 482/124 |
| 5,407,411 | A * | 4/1995 | Trainor | 482/95 |
| 5,509,894 | A * | 4/1996 | Mason et al. | 601/34 |
| 5,595,559 | A * | 1/1997 | Viel | 482/91 |
| 5,820,519 | A * | 10/1998 | Slenker | 482/4 |
| 6,241,642 | B1 * | 6/2001 | Slenker | 482/114 |
| 6,796,926 | B2 * | 9/2004 | Reinkensmeyer et al. | 482/8 |
| 6,962,570 | B2 * | 11/2005 | Callanan et al. | 601/5 |
| 7,137,959 | B2 * | 11/2006 | Phillips | 601/5 |
| 7,150,722 | B1 * | 12/2006 | Tyrrell | 602/23 |
| 7,544,155 | B2 * | 6/2009 | Agrawal et al. | 482/69 |
| 7,549,969 | B2 * | 6/2009 | van den Bogert | 602/16 |
| 7,601,109 | B2 * | 10/2009 | Roumayah | 482/142 |
| 7,749,141 | B2 * | 7/2010 | Meisterling | 482/121 |
| 7,998,040 | B2 | 8/2011 | Kram et al. | |
| 2005/0043661 | A1 * | 2/2005 | Nashner | 602/26 |

* cited by examiner

*Primary Examiner* — Kurt Fernstrom
(74) *Attorney, Agent, or Firm* — Thomas Horstemeyer, LLP

(57) ABSTRACT

In one embodiment a gait training system includes a patient interface adapted to attach to a patient's thigh, the patient interface defining a channel, a cord that passes through the channel of the patient interface, and connecting means attached to a first end of the cord for connecting the cord to the patient's forefoot, wherein pulling of the cord pulls the patient interface forward and upward to emulate hip flexion and simultaneously pulls the connecting means upward to emulate ankle dorsiflexion.

22 Claims, 7 Drawing Sheets

SYSTEMS AND METHODS FOR FACILITATING GAIT TRAINING

CROSS-REFERENCE TO RELATED APPLICATION

This application claims priority to copending U.S. provisional application entitled, "Assistive Gait Training Device," having Ser. No. 61/332,615, filed May 7, 2010, which is entirely incorporated herein by reference.

BACKGROUND

The restoration of gait for stroke survivors, patients with cerebral palsy, and patients with other neurological diseases is often cited as a primary patient goal in rehabilitation. In the early 1980's, a form of therapy intended to restore gait termed body-weight supported treadmill training (BWSTT) was developed. In BWSTT, all or a portion of the patient's body weight is supported while the patient walks on a treadmill, typically with assistance.

One of the benefits of BWSTT is the ability to enable the patient to perform a high number of repetitions of the full gait cycle early in the rehabilitation process. By way of example, patients can perform up to 2,000 steps during a 20 minute BWSTT session. In addition, the ability to adjust variables such as the amount of body-weight support, the speed of the treadmill, and the amount of assistance provided to the patient provides a flexible environment in which the intensity and focus of the treatment session can be tailored to address patient-specific deficits.

Because patients are usually incapable of making active steps on their own early in the rehabilitation cycle, physical therapists typically must manually move patients' feet step-by-step on the treadmill. This requires the physical therapists to bend over for extended periods of time, risking low back discomfort and/or injury. Furthermore, the therapy is physically exhausting to the therapists and most become fatigued after helping patients for only a few minutes. Moreover, two therapists are typically needed in BWSTT because one therapist must move the patient's foot while the other therapist operates the treadmill controls and monitors the patient.

The physical burden placed upon the physical therapist when BWSTT is performed has resulted in underutilization of that therapy. This is unfortunate because BWSTT has been reported to provide significant improvement to patient gait when performed. In an effort to reduce the physical work required by the therapist, several robotic devices have been developed for use in BWSTT that assist the patient in walking. Although such devices do reduce the amount of work for the therapist, they are very expensive and are out of reach for many rehabilitation facilities. Moreover, the robotic devices often "do all the work" for the patient and therefore do not encourage the patient's active involvement in motor learning. The devices also restrict leg and foot movement to a fixed kinematic pattern that may interfere with the active involvement of the patient. Additionally, robotic devices are heavy and act as an additional burden for the patient to overcome in developing their active waking. All of these factors reduce rehabilitation efficacy.

In view of the above discussion, it can be appreciated that it would be desirable to have an alternative system and method for facilitating gait training.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

Figure 1:
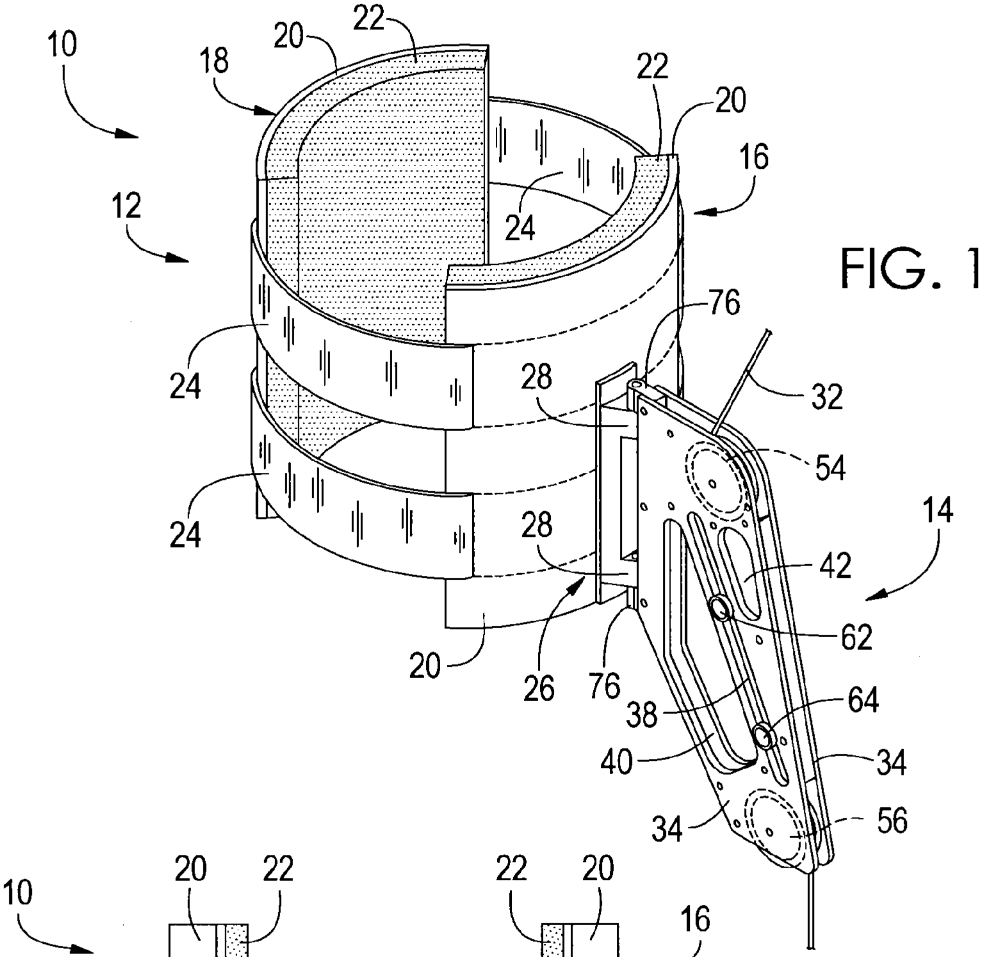
FIG. 1 is a perspective view of an embodiment of a patient interface that can be used in a gait training system.

As described above, existing gait training systems and methods exhibit one or more drawbacks, which can include the requirement for substantial physical effort on the part of the physical therapist, high cost, and reduced rehabilitation efficacy. Disclosed herein are alternative systems and methods for facilitating gait training that avoid one or more of those drawbacks. In some embodiments, the systems and methods include a patient interface that is attached to the patient's thigh and a cord that passes through the interface and connects to the patient's forefoot. When the cord is pulled, either by a therapist or by a motor, hip flexion and ankle dorsiflexion assistance are provided to the patient so as to help the patient walk, either along a treadmill or along a floor surface. Patients who can benefit from the disclosed systems and methods include stroke survivors, patients with Parkinson's disease, patients who have suffered traumatic brain injury or spinal cord injury, and children with cerebral palsy.

In the following disclosure, several embodiments are described. It is emphasized that those embodiments are merely example implementations of the disclosed inventions and that alternative embodiments are possible. All such alternative embodiments are intended to fall within the scope of this disclosure.

FIGS. 1-4 illustrate an embodiment of a patient interface 10 that can be used in a gait training system, such as one of those described below in relation to FIGS. 5-7. As is shown in FIGS. 1-4, the patient interface 10 generally comprises a leg cuff 12 that is adapted to wrap around a patient's thigh and a cord receiving component 14 that is mounted to the cuff. In the example of FIGS. 1-4, the cuff 12 comprises two opposed members, in particular a first or front member 16 and a second or rear member 18. Each member 16, 18 includes a rigid outer plate 20 and a resilient inner pad 22. As shown in the figures, both the outer plate 20 and the inner pad 22 are curved so as to generally conform to the shape of the patient's thigh. In some embodiments, the outer plates 20 can be made of a metal or plastic material and the inner pads 22 can be made of a foam material.

Extending between the two members 16, 18 are one or more straps 24 that are used to secure the members to the patient's thigh. In particular, the front member 16 can be held in position on the front of the patient's thigh and the rear member 18 can be held in position on the rear of the patient's thigh. The straps 24 can be made of an elastic or inelastic material, depending upon the characteristics desired for the cuff 12.

Attached to the outer surface of the front outer plate 20 is a mounting bracket 26 with which the cord receiving component 14 can be mounted to the front member 16 of the cuff 12. In the illustrated embodiment, the mounting bracket 26 includes two outwardly-extending tabs 28 that are adapted to receive pins 30 that secure the cord receiving component 14 to the mounting bracket. In some embodiments, the mounting bracket 26 is made of a metal material, such as aluminum or steel.

The cord receiving component 14 is a component through which a cord 32 can pass such that, when the cord is pulled, the patient interface 10 is pulled forward and upward so as to pull the patient's thigh forward and upward (hip flexion). As is described below, when the cord 32 is connected to the patient's forefoot, pulling of the cord also lifts the patient's forefoot (ankle dorsiflexion). An example construction for the cord receiving component 14 is shown in the exploded view of FIG. 4.

Figure 4:
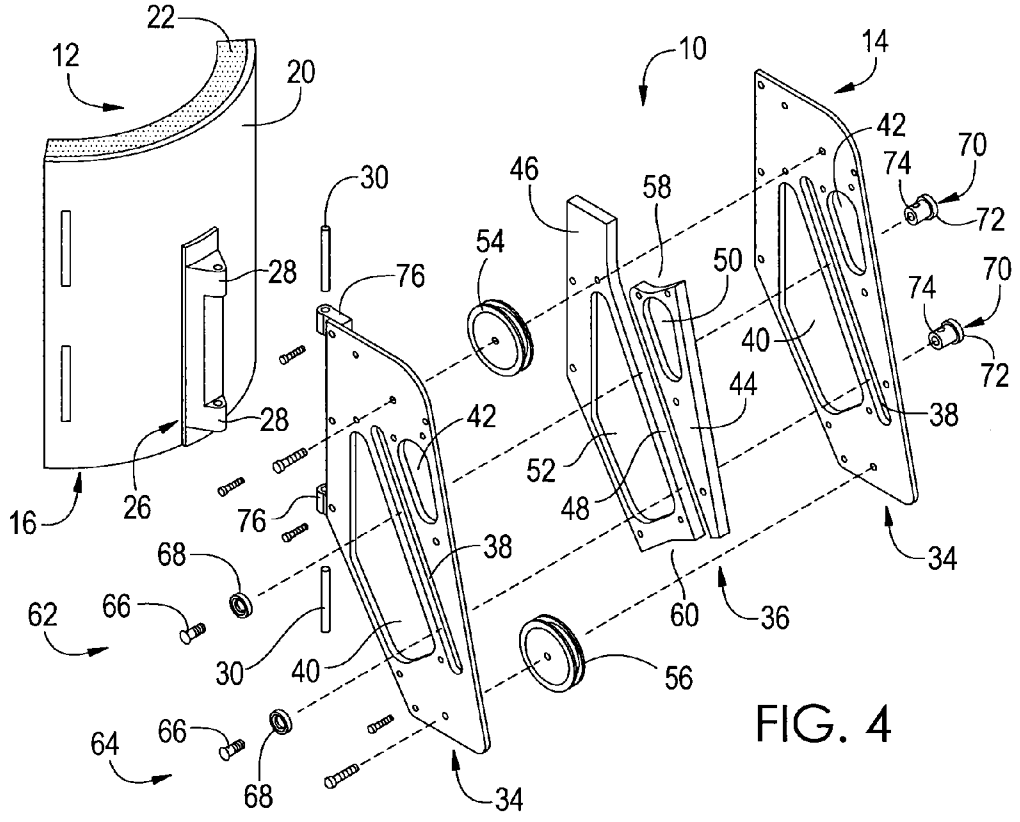
FIG. 4 is an exploded perspective view of the patient interface shown in FIG. 1.

As is illustrated in FIG. 4, the cord receiving component 14 comprises two outer members 34 between which is positioned one or more inner spacer members 36. In some embodiments, both the outer members 34 and the spacer members 36 comprise generally flat plates made of a metal material, such as aluminum or steel. Each outer member 34 can be of substantially identical construction and can comprise an elongated groove 38 that extends through the member. As described below, the grooves 38 limit the travel of the cord 32 through the receiving component 14. In the illustrated embodiment, each groove 38 is diagonally oriented and extends downward from a proximal location (relative to the thigh) to a more distal location. Regardless of their orientations, the grooves 38 align with each other when the cord receiving component 14 is assembled. As is further shown in FIG. 4, each outer member 34 can comprise openings 40 and 42 that reduce the amount of material used to construct the members. The openings 40, 42 therefore reduce the weight of the outer members 34. In addition, each outer member 34 comprises a plurality of openings through which fasteners that are used to assemble the cord receiving component 14 can pass. By way of example, each fastener can be received by another fastening element, such as a nut (not shown).

In the embodiment of FIG. 4, the spacer members 36 include a first or front spacer member 44 and a second or rear spacer member 46. The spacer members 44, 46 maintain a desired amount of spacing between the outer members 34 and further define a channel 48 along which the cord 32 can travel through the cord receiving component 14. As is further shown in FIG. 4, each spacer member 44, 46 can comprise openings 50 and 52 that reduce the amount of material and weight of the members. Furthermore, each spacer member 44, 46 comprises a plurality of openings through the aforementioned fasteners can pass.

Also positioned between the outer members 34 are a first or top pulley wheel 54 and a second or bottom pulley wheel 56. The top pulley wheel 54 is positioned near the top end of the cord receiving component 14 in a space 58 defined by the spacer members 44, 46 (at the top end of the channel 48) and the bottom pulley wheel 56 is positioned near the bottom of the cord receiving component in a space 60 defined by the spacer members (at the bottom of the channel). The wheels 54, 56 help guide the cord 32 through the cord receiving component 14. Each wheel 54, 56 has an outer groove provided around its outer edge that receives the cord 32. Because the wheels 54, 56 can freely rotate about their central axes, they reduce friction between the cord 32 and the cord receiving component. As is shown in FIG. 2, the cord 32 can pass over the rear side of the top pulley wheel 54 and over the front side of the bottom pulley wheel 56.

Figure 2:
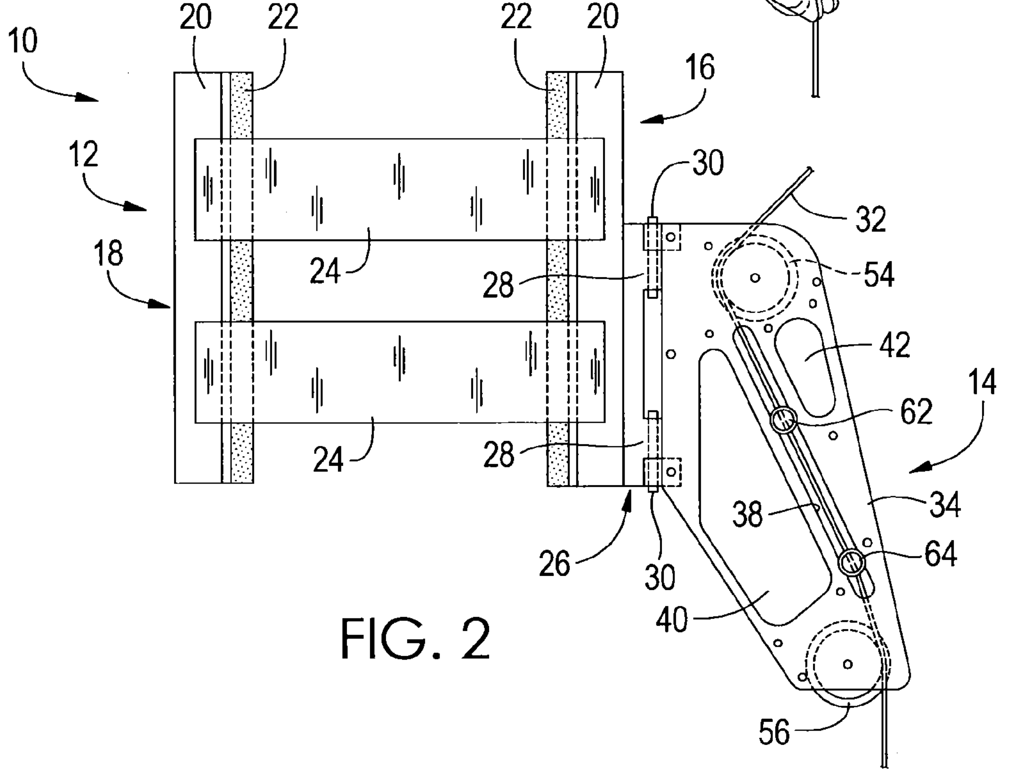
FIG. 2 is a side view of the patient interface shown in FIG. 1.
Figure 3:
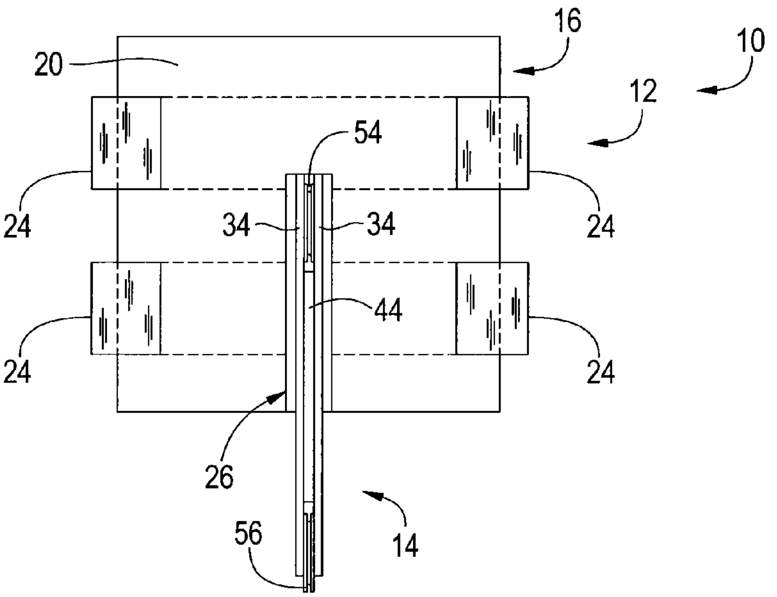
FIG. 3 is a front view of the patient interface shown in FIG. 1.

As is also shown in FIG. 2, stop members are fixedly mounted on the portion of the cord 32 that is positioned within the channel 48 defined by the spacer members 44, 46 and the grooves 38 defined by the outer members 34. In particular, a first or top stop member 62 is mounted to the cord 32 at a relatively high position along the cord, and a second or bottom stop member 64 is mounted to the cord at a relatively low position along the cord. Because the stop members 62, 64 pass through the grooves 38 of the outer members 34, the stop members limit travel of the cord through its channel 48 and, therefore, through the cord receiving component 14.

FIG. 4 shows an example embodiment for the stop members 62, 64. As is shown in that figure, the stop members 62, 64 can each comprise a threaded fastener 66, a collar 68 adapted to be positioned on the outside of a first outer member 34 through which the fastener can pass, and a fastening element 70 that has a collar 72 adapted to be positioned on the outside of a second outer member 34 and a shaft 74 that is adapted to travel along the channel 48 and the grooves 38. The shaft 74 has a threaded opening adapted to receive the threaded fastener 66. In addition, the shaft 74 has openings through its top and bottom through which the cord 32 can pass. Once the cord has been threaded through the shaft 74 the fastener 66 can be threaded into the threaded opening of the shaft to pinch the cord and fixedly secure it in place. It is noted that the stop members 62, 64 can be secured to the cord 32 in other ways. The manner in which the stop members 62, 64 are secured to the cord 32 is less important than their ability to limit travel of the cord.

With further reference to FIG. 4, also positioned between the outer members 34 are mounting elements 76 that, like the mounting tabs 28 of the mounting bracket 26, receive the pins 30. When the pins 30 are passed through the mounting elements 76 of the cord receiving component 14 and the tabs 28 of the mounting bracket 26, the cord receiving component is secured to the cuff 12.

The cord receiving component 14 is assembled with the cord 32 positioned within the channel 48 defined by the spacer members 44, 46 and is "sandwiched" between the outer members 34. When the stop members 62, 64 have been fixedly mounted to the cord 32 along a portion of the cord positioned within the grooves 38 defined by the outer members 34, the stop members will limit travel through the cord receiving component 14. In particular, passage of the cord 32 through the cord receiving component 14 is limited in the upward direction by the top stop member 62 and passage of the cord through the cord receiving component is limited in the downward direction by the bottom stop member 64.

Figure 5A:
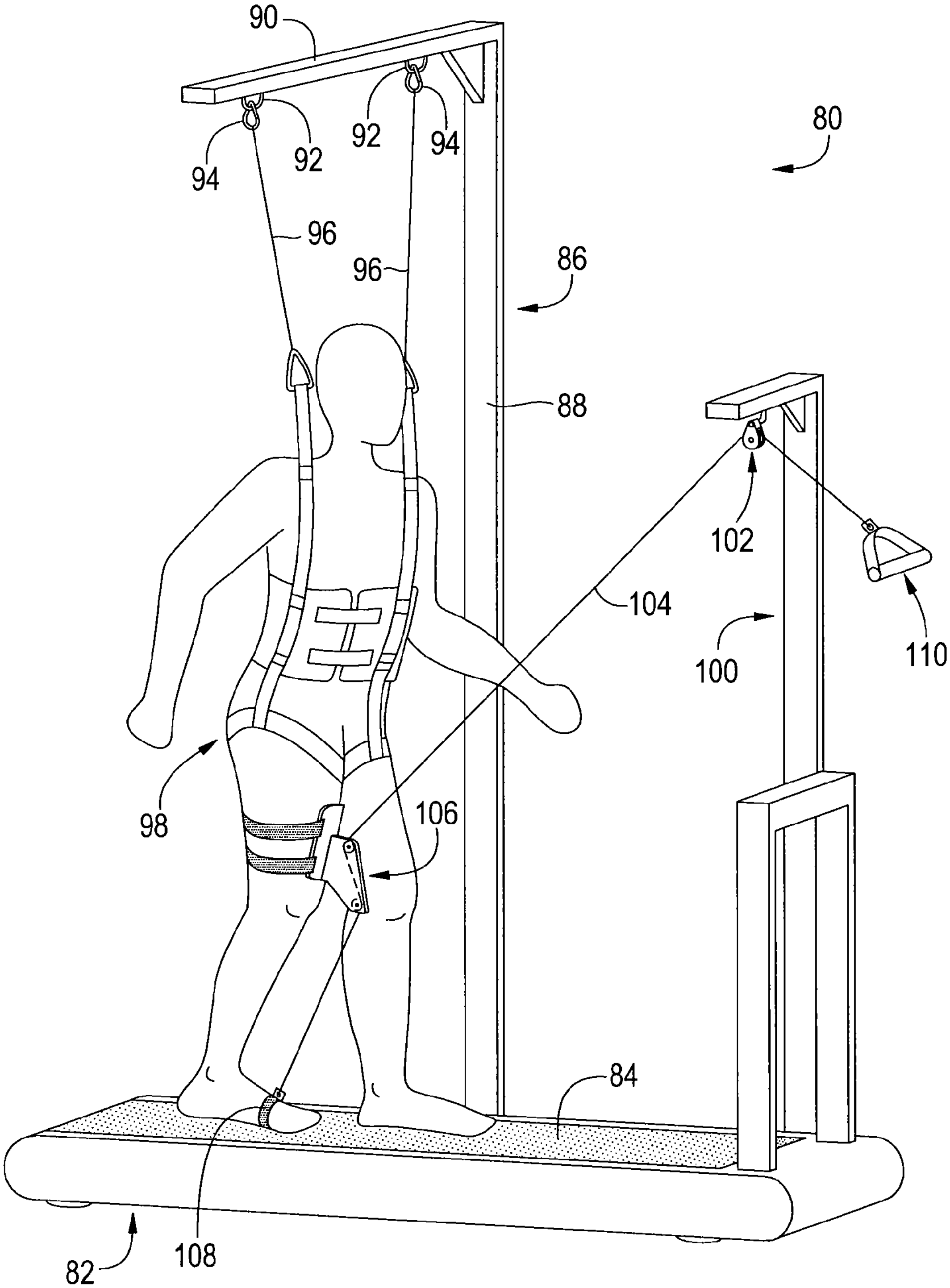
FIGS. 5A-5C illustrate a first embodiment of a gait training system, and a sequence of operation of the system.
Figure 5B:
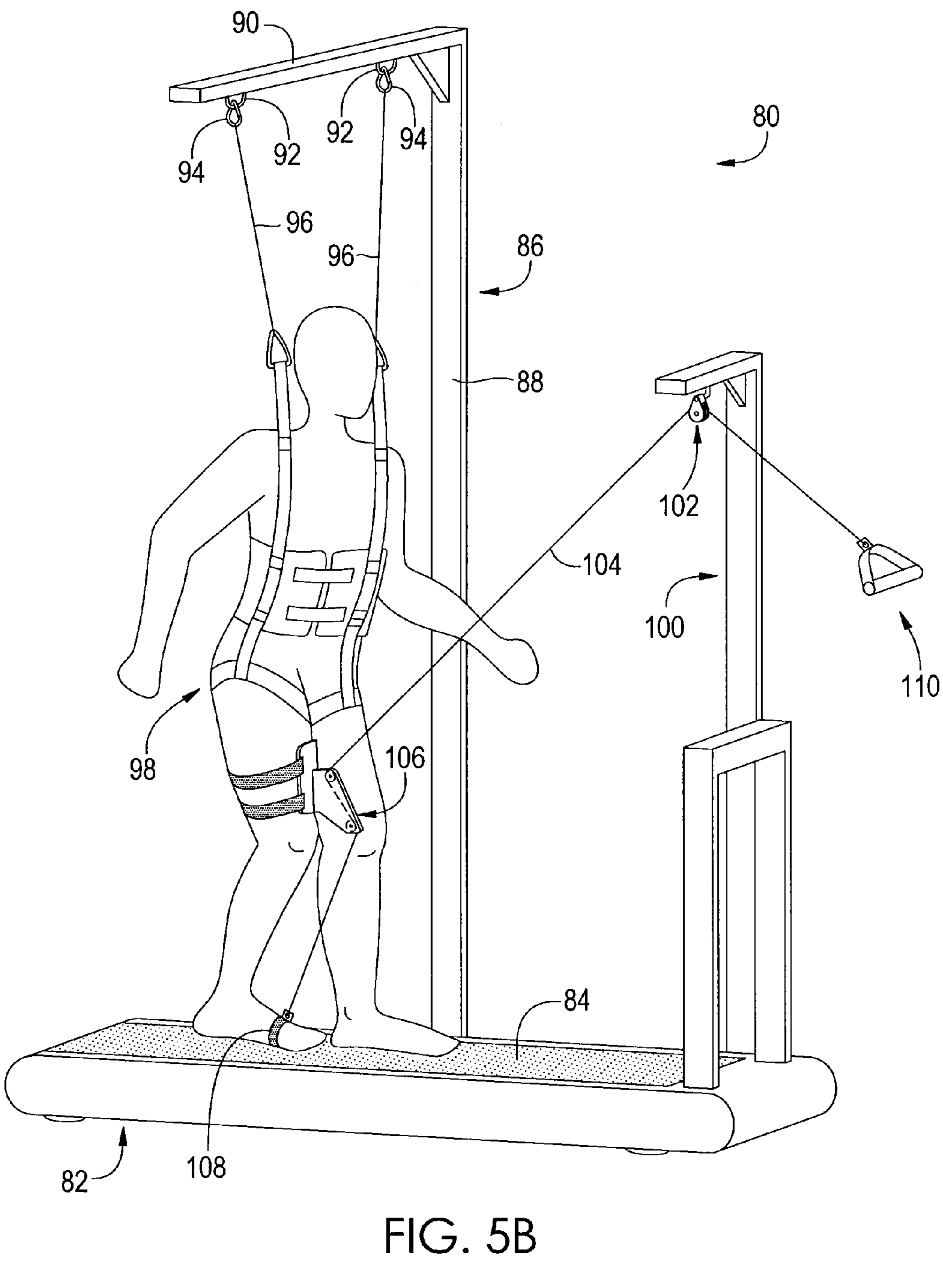
Figure 5C:
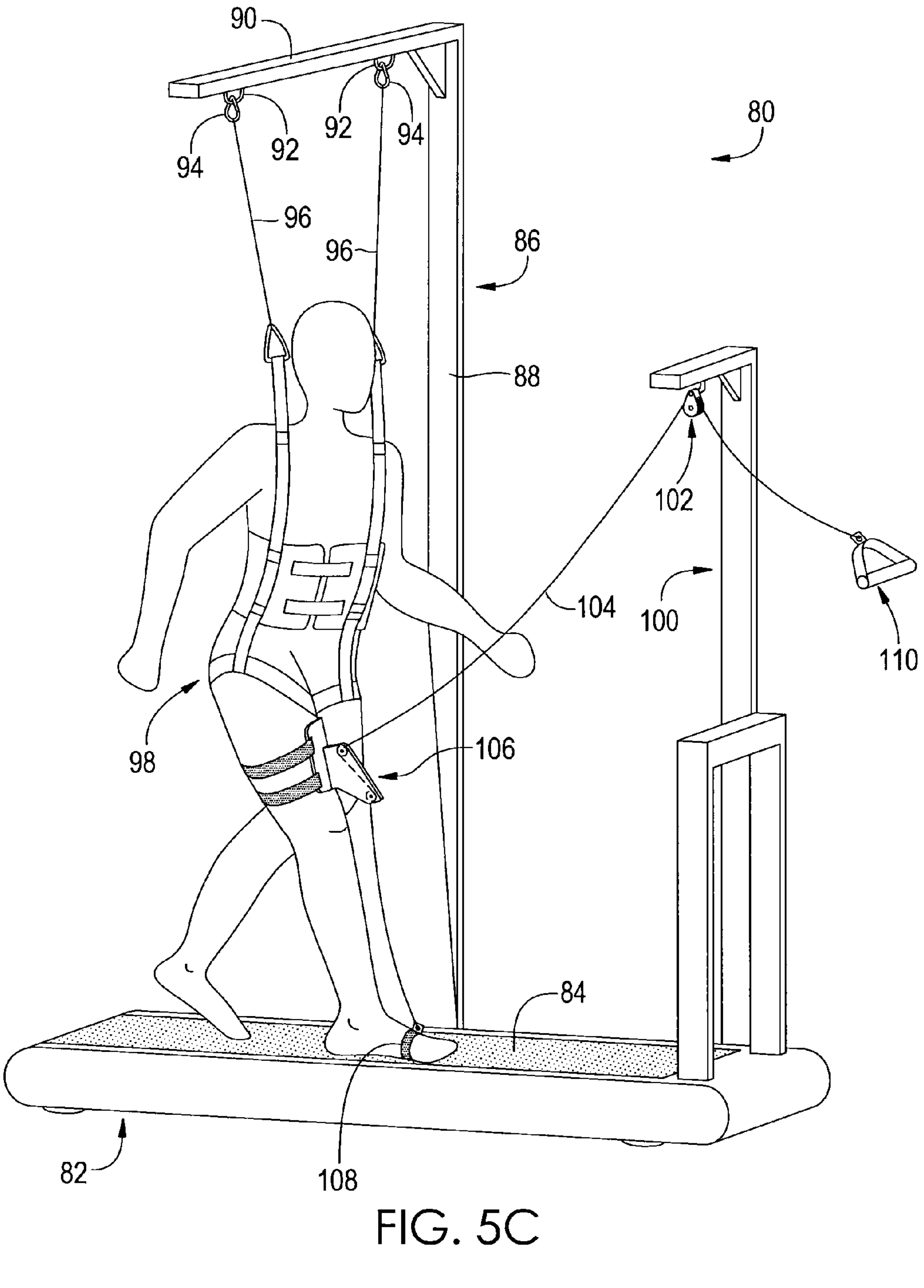

FIGS. 5A-5C illustrate a first embodiment of a gait training system 80. As is shown in those figures, the system 80 includes a treadmill machine 82. The treadmill machine 82 can be similar to conventional treadmill machines and therefore comprises a motor-driven endless belt 84 on which a patient can walk at various speeds. The system 80 further comprises a patient support 86 that supports the patient over the treadmill belt 84. The support 86 can support part of or all of the patient's body weight. In the illustrated embodiment, the patient support 86 includes a vertical beam 88 from which extends a horizontal beam 90. Attached to the horizontal beam 90 are eyelets 92 that are adapted to receive fastening elements 94 that are connected to cables 96 of a harness 98 that is worn by the patient. In some embodiments, the harness 98 wraps around the patient's torso.

The system 80 further includes a frame 100 that supports a pulley 102 at a position in front of and above the patient's thigh when the patient is standing on the treadmill belt 84. A cord 104, which can comprise a single strand or a cable, is threaded through the pulley 102 and through a patient interface 106, which is attached to the thigh of the patient and can be similar in design to the patient interface 10 shown in FIGS. 1-4. As is further shown in FIGS. 5A-5C, one end of the cord 104 is attached to the patient's forefoot with connection means in the form of a foot strap 108. The opposite end of the cord 104 is attached to a handle 110 on the opposite side of the pulley 102. As described below, the handle 110 which can be used to pull the cord 104 through the pulley 102.

FIGS. 5A-5C illustrate a sequence of operation of the system 80 in providing gait training to the patient. It is assumed for this example that therapy is to be provided only to the patient's right leg. It is noted, however, that therapy could be simultaneously provided to both legs if a patient interface 106, a foot strap 188, a cord 104, a pulley 102, and a handle 110 were provided for each leg.

Beginning with FIG. 5A, the patient's right leg is positioned in an initial, rearward position immediately before the swing phase of a forward step. The treadmill belt 84 is moving (from front to back) so as to simulate a surface over which the patient is walking. At the beginning of the swing phase, hip flexion is needed in order to move the leg forward and ankle dorsiflexion is needed to clear the belt 84 as the foot swings forward. To assist the patient in taking a step with his leg, an operator (e.g., physical therapist) pulls downward on the handle 110 so as to pull the cord 104 through the pulley 102. When the cord 104 is pulled through the pulley 102, the tension in the cord pulls the patient interface 106, as well as the patient's thigh, forward and upward to emulate the hip flexion that occurs when one initiates a forward step. Pulling on the cord 104 also pulls the cord through the patient interface 106 so as to simultaneously pull up the patient's forefoot, to emulate the ankle dorsiflexion that also occurs when one initiates a forward step. Significantly, no other assistance is provided to the patient, therefore encouraging the patient to control the impaired lower limb. Furthermore, because a pulley system is used, no rigid constraints are imposed upon the movement of the leg.

It is noted that the travel distance for ankle dorsiflexion is shorter than the travel distance for hip flexion. When the patient interface 106 has a design similar to that shown in FIGS. 1-4, the amount of travel of the patient's foot is limited by one of the aforementioned stop members provided on the cord 104. In particular, top stop member (62) is used to limit that travel. The position of that stop member can be adjusted along the cord 104 to ensure appropriate ankle dorsiflexion.

With reference next to FIG. 5B, the patient's leg is shown at an intermediate point along the forward stride. As is apparent from the position of the handle 110 in FIG. 5B, the length of the cord 104 on the right side of the pulley 102 has increased. Referring to FIG. 5C, the forward step has been completed and the patient's leg is in a final, forward position. At this point, the operator can stop pulling on the handle 110 so that the cord 104 is no longer under tension. When the cord 104 is no longer under tension, the ankle will go into plantarflexion, especially if the patient has a hyper-extended ankle joint. The position of the bottom stop member (64) along the cord 104 can be adjusted to control the degree of ankle plantarflexion that is permitted. At this point, the patient's leg can then return to the initial, rearward position shown in FIG. 5A under the urging of the treadmill belt 84, which is continuously moving rearward.

As can be appreciated from the foregoing discussion, the gait training system 80 greatly reduces the physical burden typically placed on physical therapists in providing gait training. Specifically, the physical therapist need not bend over and move the patient's feet with their hands as with previous gait training systems. This provides the physical therapist with a greater opportunity to observe and supervise of the patient. In addition, the amount of force with which the physical therapist must pull the cord is quite small. By way of example, a force of approximately 7 to 16 pounds is sufficient to assist a typical patient with his stride. Therefore, the physical therapist can help the patient walk for extended periods of time, thereby increasing the therapeutic benefit to the patient. Furthermore, assisting hip flexion and ankle dorsiflexion using the pulley system, as opposed to a therapist manually moving the foot forward, provides a better motor learning environment in which the patient is allowed and encouraged to determine other lower body movements, such as hip and knee extension, that are required in walking.

As can also be appreciated from the foregoing discussion, the gait training system 80 requires no robotic patient interface. Instead, a simply pulley system is used. Such a pulley system is less complex, lighter, more portable, and more economical than robotic systems. Furthermore, the pulley system can be used to provide only the amount of assistance that is needed to help the patient walk and does not impose any motion constraints on the patient's leg as do robotic systems. This further increases the efficacy of the therapy in that the patient is encouraged to move and control his legs instead of passively allowing a machine to move them for him.

Figure 6:
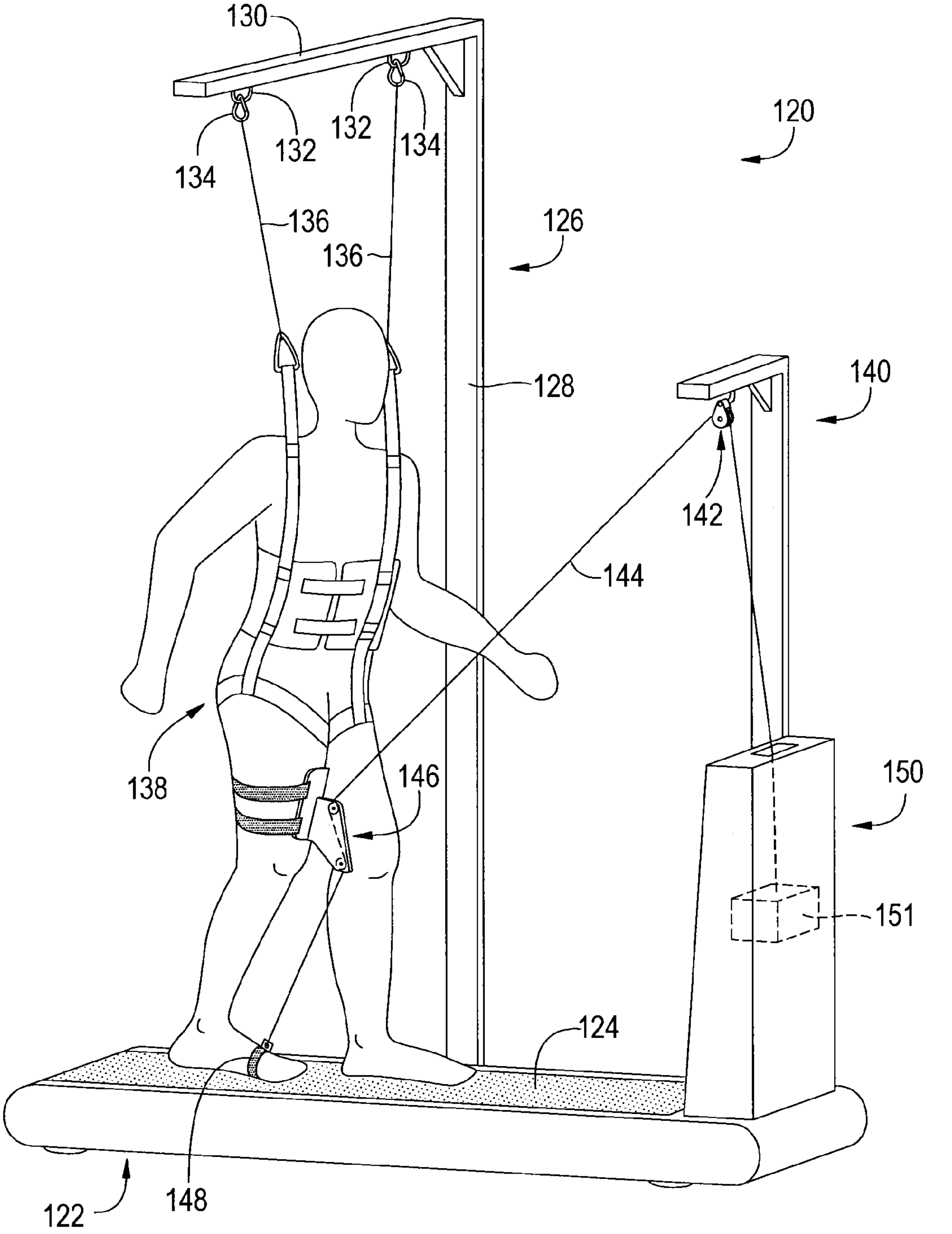
FIG. 6 illustrates a second embodiment of a gait training system.

FIG. 6 illustrates a second embodiment of a gait training system 120. The system 120 is similar to the system 80 of FIGS. 5A-5C in many ways. Therefore, the system 120 includes a treadmill machine 122 that includes a motor-driven endless belt 124 on which a patient can walk. The system 120 further comprises a patient support 126 that supports the patient over the treadmill belt 124. The patient support 126 includes a vertical beam 128 and a horizontal beam 130 to which eyelets 132 are attached that receive fastening elements 134. The fastening elements 134 are connected to cables 136 of a harness 138 that is worn by the patient.

The system 120 further includes a frame 140 that supports a pulley 142 at a position in front of and above the patient's thigh. A cord 144 is threaded through the pulley 142 and through a patient interface 146, which is attached to the thigh of the patient. As before, the patient interface 146 can be similar in design to the patient interface 10 shown in FIGS. 1-4. One end of the cord 144 is attached to the patient's forefoot with a foot strap 148. In the embodiment of FIG. 6, however, the opposite end of the cord 144 is not attached to a handle that can be used to manually pull the cord. Instead, the other end of the cord 144 is connected to a control unit 150. The control unit 150 includes an internal motor 151 that cyclically pulls and releases the cord 144 to move the patient's leg in the same manner as would a physical therapist. In some embodiments, the motor 151 is a servomotor that is controlled by a digital signal processor or other logical element to activate the pulling phase and the release phase of the therapy relative to the speed at which the treadmill belt 124 is moving. This way, the patient's walking speed will match the treadmill speed. In some embodiments, the user controls for the motor 151 can be integrated into a control panel that is used to control treadmill operation.

The system 120 is used in similar manner to the system 80. The primary difference between the two systems is that the system 120 is automated so that assistance need not be manually provided by the physical therapist. This substantially eliminates the opportunity for therapist injury and fatigue, and further frees the physical therapist to focus on other aspects of the patient's therapy.

It is noted that, as with the system 80 of FIGS. 5A-5C, the system 120 can be used to assist both of the patient's legs during walking. In such a case, the system 120 would include two patient interfaces 146, two foot straps 148, two cords 144, two pulleys 142, and possibly two internal motors 151, one to control each cord.

Figure 7:
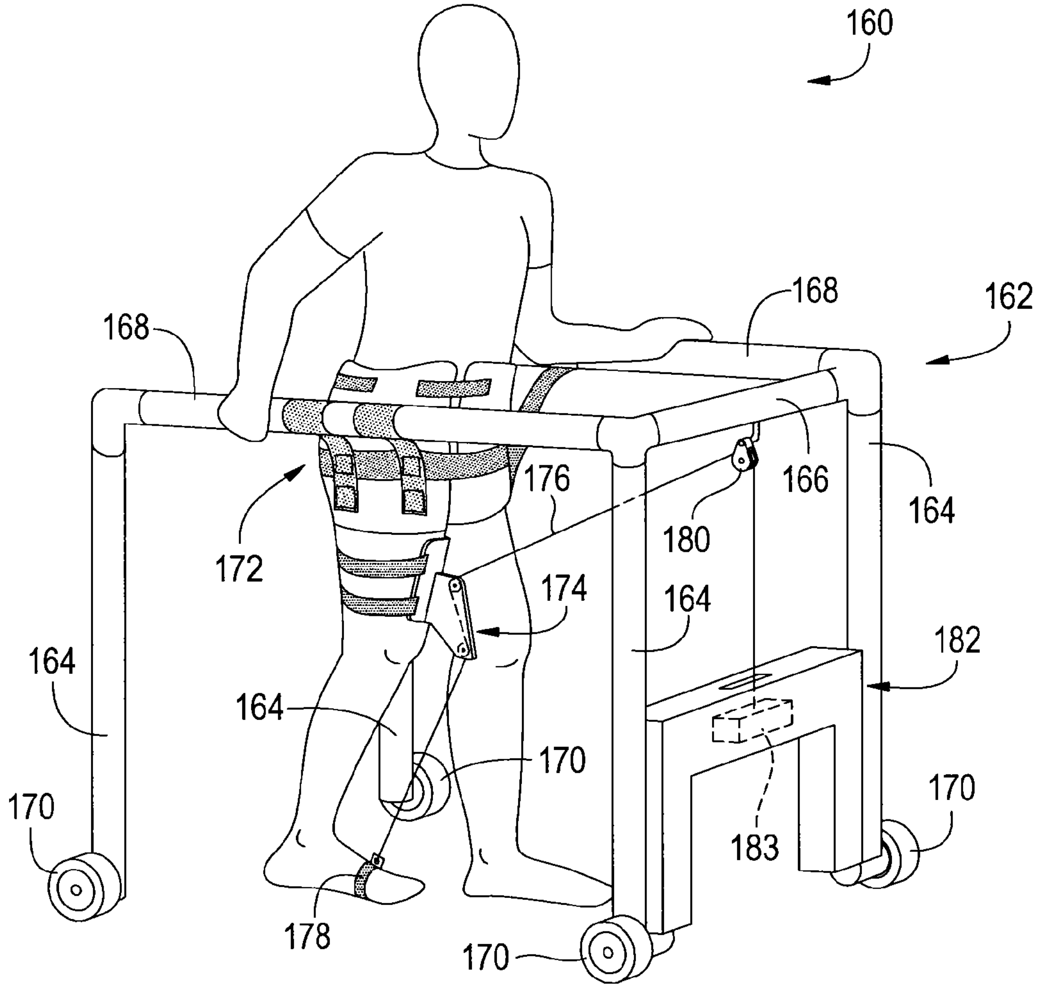
FIG. 7 illustrates a third embodiment of a gait training system.

FIG. 7 illustrates a third embodiment of a gait training system 160. Unlike the other two embodiments described above, the system 160 does not incorporate a treadmill on which the patient walks. Instead, the system 160 is configured as a "walker" with which the patient can walk across a floor surface with automated assistance.

As is shown in FIG. 7, the system 160 includes a walker frame 162 that provides support to the patient. The walker frame 162 includes both vertical beams 164 and horizontal beams that are connected together to form a generally orthogonal frame. The horizontal beams include a front cross beam 166 and two opposed side beams 168 that connect with the front cross beam. In some embodiments, each of the vertical and horizontal beams is made of metal or plastic tubing so as to be strong but lightweight. Mounted to the bottom end of each vertical beam 164 is a wheel 170, which can comprise a resilient outer surface that improves grip. In some embodiments, the angular orientation of each wheel 170 (about its vertical axis) is fixed such that the walker frame 162 can only travel along one linear direction. In other embodiments, two or more of the wheels 170 (e.g., the rear wheels) are free to pivot about their vertical axes to enable turning of the walker frame 162.

As is shown in FIG. 7, the patient can be positioned between the two opposed side beams 168 and can be supported in that position with a harness 172 that attaches to the side beams. The harness 172 can be used to support nearly all or only a portion of the patient's weight, depending upon the patient's condition. Attached to the patient's thigh is a patient interface 174, which can be of a design similar to that shown in FIGS. 1-4. Therefore, a cord 176 can pass through the patient interface 174 and connect to a foot strap 178 attached to the patient's forefoot.

The cord 176 extends up from the patient interface 174 and passes through a pulley 180 that is mounted to the front cross beam 166. The cord 176 then extends downward to a control unit 182, which is mounted to the walker frame 162 beneath the front cross beam 166 and between the front vertical beams 164. Like the control unit 150 described in relation to the embodiment of FIG. 6, the control unit 182 includes an internal motor 183 that cyclically pulls and releases the cord 176 to move the patient's leg in the same manner as would a physical therapist. In addition, the motor 183 (or a further internal motor) drives the front wheels 170 so that the walker frame 162 can travel along the floor surface under motorized control. In some embodiments, each motor is a servomotor that is controlled by a digital signal processor or other logical element to control the pulling/release of the cord 176 as well as the speed at which the wheels 170 are driven. In this manner, the speed of the walker frame 162 can be controlled to match the speed at which the patient walks.

It is noted that, as with the system 120 of FIG. 6, the system 160 of FIG. 7 can be used to assist both of the patient's legs with walking. In such a case, the system 160 would include two patient interfaces 174, two foot straps 178, two cords 176, two pulleys 180, and possibly two internal motors 183, one to control each cord.

Claimed are:

1. A gait training system comprising:

a patient interface adapted to attach to a patient's thigh, the patient interface defining a channel;

a cord that passes through the channel of the patient interface; and connecting means attached to a first end of the cord for connecting the cord to the patient's forefoot;

wherein pulling of the cord pulls the patient interface forward and upward to emulate hip flexion and simultaneously pulls the connecting means upward to emulate ankle dorsiflexion.

2. The system of claim 1, wherein the patient interface comprises a leg cuff adapted to wrap around the patient's thigh and a cord receiving component mounted to the leg cuff.

3. The system of claim 2, wherein the leg cuff comprises opposed members adapted to contact the patient's thigh and one or more straps adapted to hold the opposed members to the patient's thigh.

4. The system of claim 2, wherein the channel is a channel formed within the cord receiving component that extends from a top end of the component to a bottom end of the component.

5. The system of claim 4, wherein the cord receiving component comprises a pulley wheel positioned at an end of the channel that receives the cord, wherein the wheel reduces friction between the cord and the cord receiving component.

6. The system of claim 4, wherein the cord receiving component comprises a first wheel positioned at a top end of the channel and a second wheel positioned at a bottom end of the channel, the wheels receiving the cord and reducing friction between the cord and the cord receiving component.

7. The system of claim 4, further comprising a stop member attached to the cord at a point along the channel and wherein the cord receiving component comprises a groove along which the stop member travels, wherein the stop member halts travel of the cord in one direction when the stop member abuts an end of the groove.

8. The system of claim 1, further comprising a pulley positioned in front of and above the patient interface, the cord passing through the pulley.

9. The system of claim 1, further comprising a harness adapted to attach to the patient's body.

10. The system of claim 9, further comprising a treadmill on which the patient can walk.

11. The system of claim 10, further comprising a patient support that extends over the treadmill from which the harness is hung.

12. The system of claim 11, further comprising a handle attached to a second end of the cord with which the cord can be manually pulled through the pulley to assist the patient in walking on the treadmill.

13. The system of claim 11, further comprising a motorized control unit that cyclically pulls the cord through the pulley to assist the patient in walking on the treadmill.

14. The system of claim 9, further comprising a walker frame including a front cross beam to which the pulley is mounted and side beams to which the harness is attached.

15. The system of claim 14, further comprising a motorized control unit that cyclically pulls the cord through the pulley to assist the patient in walking along a floor surface with the support of the walker frame.

16. The system of claim 15, wherein the walker frame comprises wheels that enable the walker frame to roll along the floor surface.

17. The system of claim 16, wherein one or more of the wheels are motorized so that the walker frame moves across the floor surface at a speed that matches the walking speed of the patient.

18. A patient interface comprising:

a leg cuff adapted to wrap around a patient's thigh; and a cord receiving component mounted to the leg cuff, the cord receiving component defining an inner channel that extends from a top end of the component to a bottom end of the component, the cord receiving component further comprising a top pulley wheel positioned at a top end of the inner channel and a bottom wheel positioned at a bottom end of the channel, the channel and wheels being adapted to receive a cord that passes through the cord receiving member.

19. The patient interface of claim 18, wherein the leg cuff comprises opposed members adapted to contact the patient's thigh and one or more straps adapted to hold the opposed members to the patient's thigh.

20. The patient interface of claim 18, wherein inner channel is diagonally oriented within the cord receiving component.

21. The patient interface of claim 18, wherein the cord receiving component comprises two outer members and a spacer member positioned between the outer members, the spacer member defining at least part of the inner channel.

22. The patient interface of claim 21, wherein each outer member has a groove that aligns with the inner channel, the grooves being adapted to receive a stop member that is provided on the cord.

* * * * *